United States Patent
Zhang et al.

(10) Patent No.: US 8,270,848 B2
(45) Date of Patent: Sep. 18, 2012

(54) DEVICE AND METHOD FOR RECEIVING DQPSK SIGNAL AND METHOD FOR OBTAINING DQPSK SIGNAL

(75) Inventors: Xinliang Zhang, Wuhan (CN); Lun Wei, Shenzhen (CN); Wei Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 12/791,536

(22) Filed: Jun. 1, 2010

(65) Prior Publication Data

US 2010/0254719 A1 Oct. 7, 2010

Related U.S. Application Data

(63) Continuation of application No. PCT/CN2008/073206, filed on Nov. 26, 2008.

(30) Foreign Application Priority Data

Dec. 14, 2007 (CN) ............................ 200710179571

(51) Int. Cl.
H04B 10/04 (2006.01)

(52) U.S. Cl. ........ 398/188; 398/185; 398/183; 398/140; 398/202

(58) Field of Classification Search .................. 398/202, 398/212, 188, 140, 185, 183
See application file for complete search history.

(56) References Cited

U.S. PATENT DOCUMENTS

| | | | |
|---|---|---|---|
| 5,953,140 A * | 9/1999 | McKiel, Jr. ...................... | 398/79 |
| 7,327,961 B2 * | 2/2008 | Griffin ........................... | 398/188 |
| 7,349,636 B2 * | 3/2008 | Zitelli ........................... | 398/185 |

(Continued)

FOREIGN PATENT DOCUMENTS

CN 1972161 A 5/2007

(Continued)

OTHER PUBLICATIONS

Written Opinion of the International Searching Authority issued in corresponding PCT Patent Application No. PCT/CN2008/073206, mailed Mar. 12, 2009.

(Continued)

*Primary Examiner* — Kenneth Vanderpuye
*Assistant Examiner* — Hibret Woldekidan
(74) *Attorney, Agent, or Firm* — Brinks Hofer Gilson & Lione (57) ABSTRACT

A device and a method for receiving a differential quadrature phase shift keying (DQPSK) signal and a method for obtaining a DQPSK signal are provided. The device includes: a splitter, configured to split the DQPSK signal to obtain two optical signals; two optical bandpass filters, connected to the splitter and configured to optically bandpass filter the two optical signals respectively, in which the two optical bandpass filters respectively have a positive frequency offset and a negative frequency offset from a central frequency of the DQPSK signal received by the splitter; and two photoelectric detectors, correspondingly connected to the two optical bandpass filters and configured to photoelectrically convert the filtered optical signals to obtain data signals. In the method, the DQPSK signal is filtered and demodulated by the optical bandpass filters, and then photoelectrically converted by the photoelectric detectors to recover the data signals, such that the problems of poor stability and polarization dependence caused by the Mach-Zehnder interferometer (MZI) are avoided, thereby greatly improving the performance of an optical transmission system.

3 Claims, 6 Drawing Sheets

U.S. PATENT DOCUMENTS

| | | | |
|---|---|---|---|
| 7,398,022 B2 * | 7/2008 | Zitelli | 398/183 |
| 8,032,036 B2 * | 10/2011 | Chen et al. | 398/202 |
| 2005/0002676 A1 | 1/2005 | Zitelli | |
| 2005/0074245 A1 * | 4/2005 | Griffin | 398/188 |
| 2006/0171718 A1 | 8/2006 | Hoshida | |
| 2007/0127933 A1 * | 6/2007 | Hoshida et al. | 398/202 |
| 2007/0177882 A1 | 8/2007 | Akiyama | |
| 2007/0230625 A1 * | 10/2007 | Hironishi et al. | 375/329 |
| 2009/0115914 A1 * | 5/2009 | Jiang | 348/735 |
| 2009/0147896 A1 * | 6/2009 | Frankel et al. | 375/354 |
| 2010/0111540 A1 * | 5/2010 | Caplan et al. | 398/140 |
| 2010/0119007 A1 * | 5/2010 | Kawahara et al. | 375/296 |
| 2011/0158654 A1 * | 6/2011 | Zhang et al. | 398/158 |

FOREIGN PATENT DOCUMENTS

| | | |
|---|---|---|
| EP | 1791274 A1 | 5/2007 |
| EP | 1 796 297 A1 | 6/2007 |
| EP | 1 841 099 A1 | 10/2007 |

OTHER PUBLICATIONS

Lei et al., "The Principle of Optical DQPSK Modulation", Beijing University of Posts and Telecommunications, China Academic Journal Electronic Publishing House, 1994-2010, pp. 47-49.

International Search Report issued in corresponding PCT Application No. PCT/CN2008/073206; mailed Mar. 12, 2009.

Extended European Search Report issued in corresponding European Patent Application No. 08863384.7, mailed Jun. 15, 2011.

Winzer et al., "Advanced Modulation Formats for High-Capacity Optical Transport Networks", Journal of Lightwave Technology, vol. 24, No. 12, Dec. 2006.

Weber et al., "Ultrahigh-Speed OTDM-Transmission Technology", Journal of Lightwave Technology, vol. 24, No. 12, Dec. 2006.

* cited by examiner

DEVICE AND METHOD FOR RECEIVING DQPSK SIGNAL AND METHOD FOR OBTAINING DQPSK SIGNAL

CROSS-REFERENCE TO RELATED APPLICATIONS

This application is a continuation of International Application No. PCT/CN2008/073206, filed on Nov. 26, 2008, which claims priority to Chinese Patent Application No. 200710179571.6, filed on Dec. 14, 2007, both of which are hereby incorporated by reference in their entireties.

FIELD OF THE TECHNOLOGY

The present disclosure relates to the field of mobile communication technology, and more particularly to a device and a method for receiving a differential quadrature phase shift keying (DQPSK) signal and a method for obtaining a DQPSK signal.

BACKGROUND

In an optical transmission system, the signal transmission performance is affected by various transmission impairments of transmission links such as chromatic dispersion, non-linear effects, and polarization mode dispersion (PMD). In recent years, with the rapid development of the code type technologies for the optical transmission system, novel modulation formats capable of effectively reducing the influence caused by impairments of the transmission links have come into being. It is generally recognized that a DQPSK as a vector modulation format reported in literature during OFC2002 is the most promising modulation format for transmission systems at a transmission rate higher than 40 Gb/s. Researches show that, the DQPSK has a very small spectrum width and realizes a channel spacing of 12.5-25 GHz in DWDM systems of 10 Gbit/s; as compared with known modulation formats for optical modulation systems such as Non Return to Zero (NRZ) and binary differential phase shift keying (DPSK), at the same symbol rate, the DQPSK maintains the chromatic dispersion tolerance unchanged, but the system capacity thereof is twice of that of the modulation formats such as NRZ and DPSK; since the DQPSK can realize constant-envelope transmission or near constant-envelope transmission, various non-linear effects of the optical fibers, such as cross phase modulation (XPM) and self phase modulation (SPM), can be inhibited; and the DQPSK has a large symbol delay, and can improve the chromatic dispersion tolerance and PMD tolerance as well as spectral efficiency.

Figure 1:
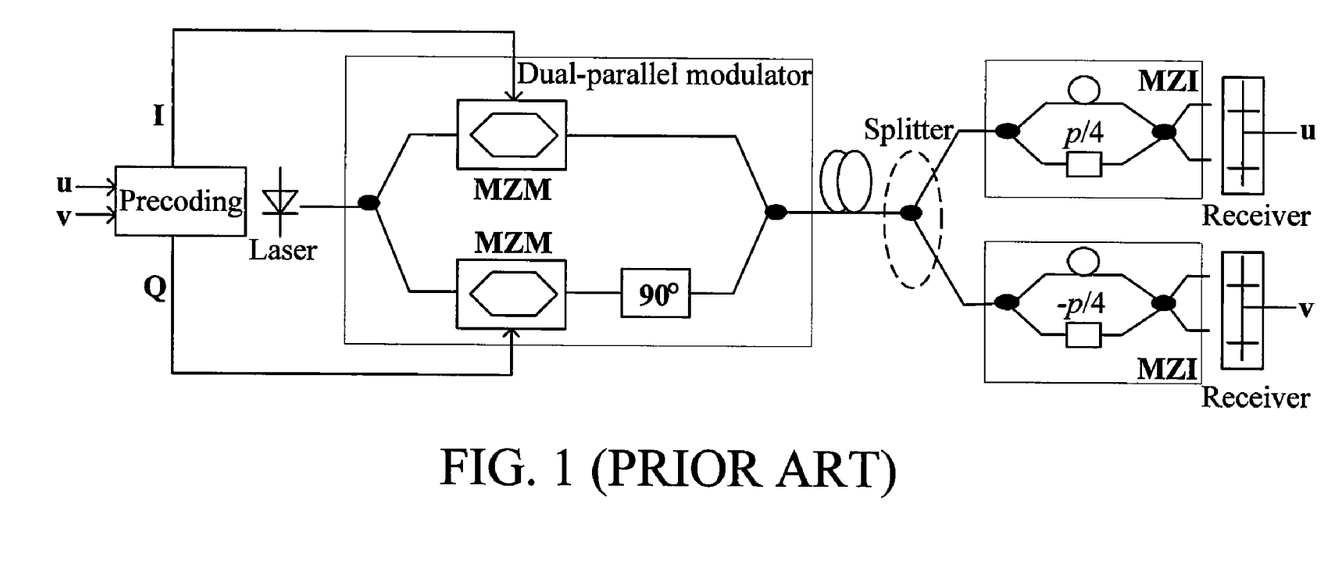
FIG. 1 is a schematic view of a DQPSK signal transmitting end and a DQPSK signal receiving end in the prior art.

In the prior art, as shown in FIG. 1, a DQPSK signal transmitting end uses a pre-coding module to pre-code two input data signals u and v, so as to generate two driving electric signals I and Q. The driving electric signals I and Q respectively drive an upper branch and a lower branch of a dual-parallel MZ modulator, such that Mach-Zehnder modulators (MZMs) modulate a real part and an imaginary part of an input optical carrier to generate a real-part signal and an imaginary-part signal. After passing through a 90° phase shifter, the imaginary-part signal is combined with the real-part signal to generate an optical DQPSK signal. A DQPSK signal receiving end receives the DQPSK signal, uses a splitter to split the DQPSK signal into an upper optical signal and a lower optical signal, uses two Mach-Zehnder interferometers (MZIs) to respectively demodulate the upper optical signal and the lower optical signal of the DQPSK, and then uses two balanced receivers to recover signals u and v from the optical signals, thereby completing the receiving and demodulation of the signal.

Through making researches, the inventors found that the prior art at least has the following problems.

Since the DQPSK signal receiving end uses two MZIs and two balanced receivers to demodulate the DQPSK signal, the demodulation manner is rather complex, and has a high cost. In addition, since the MZIs have poor stability and are polarization dependent, the performance of the optical transmission system is greatly affected. Moreover, the higher the signal transmission rate is, the higher the accuracy requirements for the MZI will be, and the higher the cost for manufacturing the MZI will be.

SUMMARY

Accordingly, the present disclosure is directed to a device and a method for receiving a DQPSK signal, which are applicable to improve performance of an optical transmission system while ensuring simple demodulation of the DQPSK signal.

The present disclosure is also directed to a method for obtaining a DQPSK signal, so as to enable the DQPSK signal obtained through the method to be easily received and processed by a DQPSK signal receiving end.

In an embodiment, the present disclosure provides a device for receiving a DQPSK signal, which includes: a splitter, configured to split the DQPSK signal to obtain two optical signals; two optical bandpass filters, connected to the splitter, and configured to optically bandpass filter the two optical signals respectively, in which the two optical bandpass filters respectively have a positive frequency offset and a negative frequency offset from a central frequency of the DQPSK signal received by the splitter; and two photoelectric detectors, correspondingly connected to the two optical bandpass filters, and configured to photoelectrically convert the filtered optical signals to obtain data signals.

In another aspect of the embodiment, the DQPSK signal is filtered and demodulated by the optical bandpass filters, and then photoelectrically converted by the photoelectric detectors to recover the data signals, such that the problems of poor stability and polarization dependence caused by the MZI are avoided, thereby greatly improving the performance of the optical transmission system. Meanwhile, the higher the transmission rate of the DQPSK signal is, the more easily the bandpass filters are manufactured, such that the problem that the MZI is difficult to be manufactured when the signal transmission rate is increased can be avoided, thereby greatly reducing the cost of the DQPSK signal receiving device.

In an embodiment, the present disclosure further provides a method for receiving a DQPSK signal, which includes the following steps.

The DQPSK signal is split to obtain two optical signals.

The two optical signals are respectively optically bandpass filtered by two optical bandpass filters that respectively have a positive frequency offset and a negative frequency offset from a central frequency of the DQPSK signal.

The filtered optical signals are respectively photoelectrically converted to obtain data signals.

In this solution, since the DQPSK signal is demodulated by filtering, the problems about complex demodulation, poor transmission performance, and high cost brought by the MZI are solved, such that the demodulation of the DQPSK signal can be achieved more easily while improving the transmission performance, and the cost is greatly reduced.

The demodulation module provided by the embodiments of the present disclosure is quite simple. The demodulation module uses the adjustable filters to demodulate the DQPSK signal, which thus has high stability and polarization independence features. The DQPSK signal at a higher rate can be demodulated by simply increasing the bandwidth and offset of the optical bandpass filters, and the increased bandwidth further enables the optical bandpass filters to be easily manufactured. Therefore, the higher the signal transmission rate is, the more easily the device is manufactured.

In an embodiment, the present disclosure further provides a method for obtaining a DQPSK signal, which includes the following steps.

Input data is pre-coded according to pre-coding transforming equations $$I_k = \overline{uv}I_{k-1} + \overline{uv}Q_{k-1} + uv\overline{I}_{k-1} + u\overline{v}Q_{k-1}$$

$$Q_k = \overline{uv}Q_{k-1} + u\overline{v}I_{k-1} + \overline{u}vI_{k-1} + uv\overline{Q}_{k-1}$$

or $$I_k = \overline{u}I_{k-1}\overline{Q}_{k-1} + v\overline{I}_{k-1}\overline{Q}_{k-1} + u\overline{I}_{k-1}Q_{k-1} + \overline{v}I_{k-1}Q_{k-1}$$

$$Q_k = \overline{v}I_{k-1}Q_{k-1} + u\overline{I}_{k-1}\overline{Q}_{k-1} + \overline{u}I_{k-1}Q_{k-1} + vI_{k-1}\overline{Q}_{k-1}$$

to obtain two driving signals.

An input optical carrier is modulated by using the two driving signals respectively, so as to obtain a real-part signal and an imaginary-part signal.

The real-part signal and the imaginary-part signal are combined to generate the DQPSK signal.

In this solution, the pre-coding method is adopted to enable an obtained corresponding relation between a phase shift value of the DQPSK signal and bit information of the data signals to be consistent with a corresponding relation between a phase shift value of the DQPSK signal and the optical signals obtained through demodulation at the DQPSK signal receiving end, such that the data signals are directly obtained after the DQPSK signal receiving end photoelectrically converts the obtained optical signals by filtering and demodulation, thereby further simplifying the construction of the DQPSK signal receiving end.

The present disclosure is described as follows in further detail through specific embodiments with reference to the accompanying drawings.

DETAILED DESCRIPTION OF THE EMBODIMENTS

Figure 2:
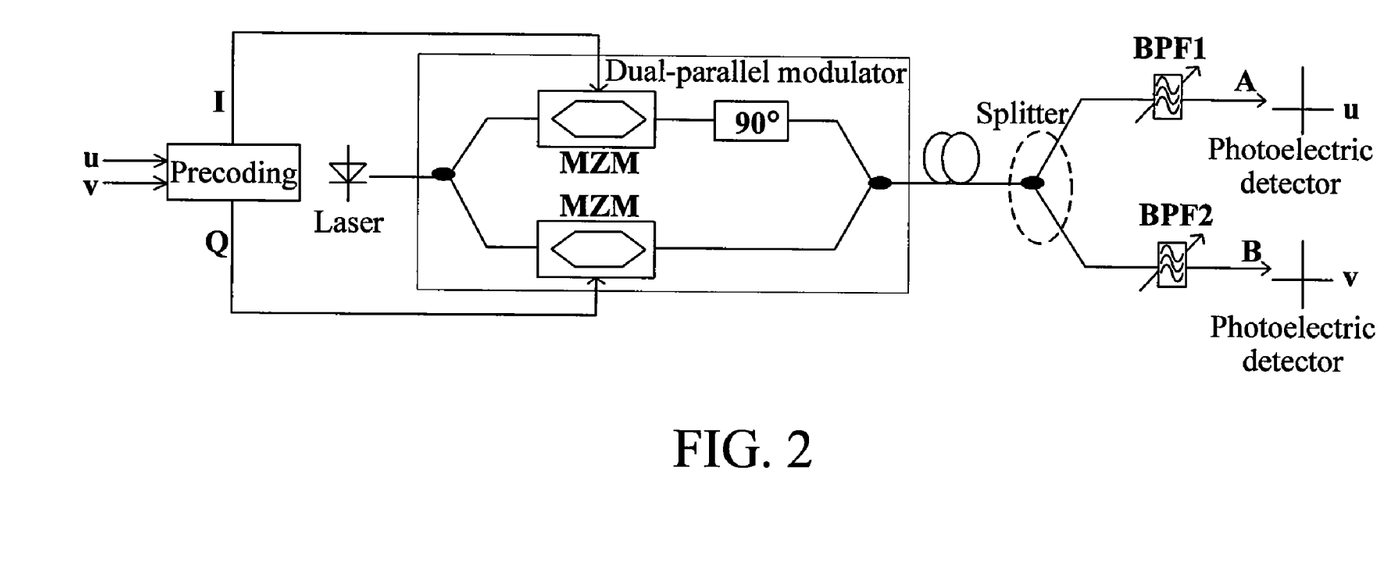
FIG. 2 is a schematic structural view of a first embodiment of a device for receiving a DQPSK signal according to the present disclosure.

FIG. 2 is a schematic structural view of a first embodiment of a device for receiving a DQPSK signal according to the present disclosure. In this embodiment, a DQPSK signal transmitting end still adopts an existing device, except for disposing a 90° phase shifter after an MZM that generates a real-part signal. A pre-coding module pre-codes data signals u and v by using coding rules listed in Table 1 and generates two driving electric signals I and Q. The driving electric signals I and Q respectively drive an upper branch MZM and a lower branch MZM of a dual-parallel modulator to modulate a real part and an imaginary part of an input optical carrier emitted by a laser, so as to generate a real-part signal and an imaginary-part signal. The real-part signal and the imaginary-part signal are combined to generate a DQPSK signal, which is transmitted to a DQPSK signal receiving device through optical fibers.

The DQPSK signal receiving device includes a splitter, and optical bandpass filters and photoelectric detectors sequentially connected to the splitter. For ease of description, an optical bandpass filter whose central wavelength has a negative wavelength offset (corresponding to a positive frequency offset) from a central wavelength of the DQPSK signal is referred to as BPF1, and an optical bandpass filter whose central wavelength has a positive wavelength offset (corresponding to a negative frequency offset) from the central wavelength of the DQPSK signal is referred to as BPF2. For a signal at a rate of B, the absolute values of the frequency offsets of the bandpass filters are preferably 0.6B-2B, so that the absolute values of the wavelength shifts thereof are derived as $$0.6B \times \frac{\lambda_c^2}{c} - 2B \times \frac{\lambda_c^2}{c},$$

in which c is the velocity of light and $\lambda_c$ is the central wavelength. After the DQPSK signal receiving device receives the DQPSK signal, the splitter splits the DQPSK signal into two optical signals, the BPF1 demodulates one optical signal to obtain a demodulated optical signal A, the BPF2 demodulates the other optical signal to obtain a demodulated optical signal B, and then A and B are respectively photoelectrically converted by a photoelectric detector, so as to respectively recover the data signals u and v. The 90° phase shifter at the DQPSK signal receiving end may also be disposed after an MZM that generates an imaginary-part signal. Correspondingly, the data signal recovered by the BPF1 and the photoelectric detector is v, and the data signal recovered by the BPF2 and the photoelectric detector is u. Since the DQPSK signal receiving device in this embodiment uses the optical bandpass filters for demodulation, the problems about complex demodulation, poor transmission performance, and high cost brought by the MZI are solved. Thus, the demodulation operation in the DQPSK signal receiving device is simplified, and the transmission performance is improved. In addition, the higher the transmission rate of the DQPSK signal is, the more easily the optical bandpass filters are manufactured, such that the cost of the DQPSK signal receiving device is further reduced.

Figure 3:
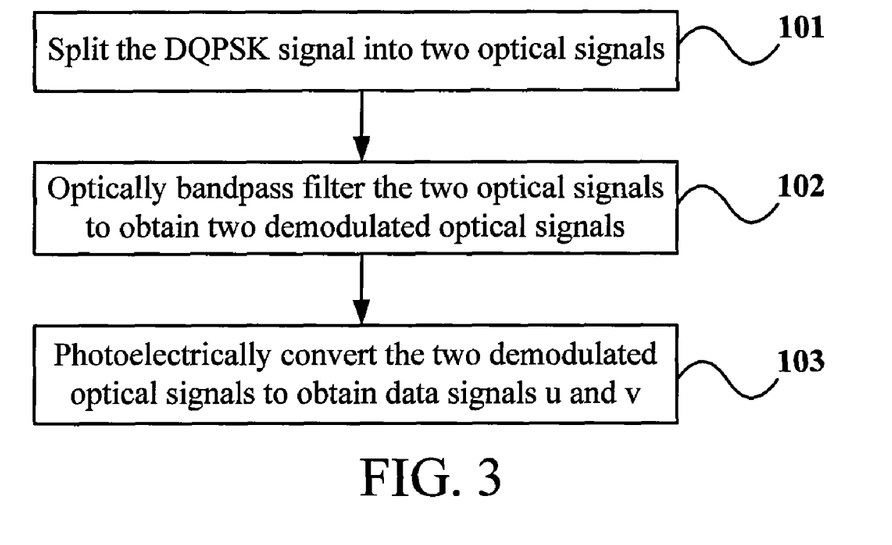
FIG. 3 is a flow chart of a first embodiment of a method for receiving a DQPSK signal according to the present disclosure.

FIG. 3 is a flow chart of a first embodiment of a method for receiving a DQPSK signal according to the present disclosure. It is assumed that the pre-coding module pre-codes the data $$I_k = \overline{uv}I_{k-1} + \overline{uv}\overline{Q}_{k-1} + uv\overline{I}_{k-1} + u\overline{v}Q_{k-1}$$

$$Q_k = \overline{uv}Q_{k-1} + u\overline{v}\overline{I}_{k-1} + \overline{uv}I_{k-1} + uv\overline{Q}_{k-1}$$

or signals u and v by using pre-coding equations of $$I_k = \overline{u}I_{k-1}\overline{Q}_{k-1} + v\overline{I}_{k-1}\overline{Q}_{k-1} + u\overline{I}_{k-1}Q_{k-1} + \overline{v}I_{k-1}Q_{k-1}$$

$$Q_k = \overline{v}\overline{I}_{k-1}Q_{k-1} + u\overline{I}_{k-1}\overline{Q}_{k-1} + \overline{u}I_{k-1}Q_{k-1} + vI_{k-1}\overline{Q}_{k-1}$$

or by using coding rules as shown in Table 1.

TABLE 1

| $u_k$ | 1 | 1 | 0 | 0 |
|---|---|---|---|---|
| $v_k$ | 1 | 0 | 1 | 0 |
| $I_k$ | $\overline{I}_{k-1}$ | $Q_{k-1}$ | $\overline{Q}_{k-1}$ | $I_{k-1}$ |
| $Q_k$ | $\overline{Q}_{k-1}$ | $\overline{I}_{k-1}$ | $I_{k-1}$ | $Q_{k-1}$ |

Initial values of I and Q may be 00, 01, 10, or 11. For example, when the initial values of I and Q are 11, as for data signals u and v given as follows, corresponding values of the driving electric signals I and Q are listed as follows.
u 0 0 0 1 0 1 0 0 0 1 0 1 1 0 0 1 1 0 0
v 0 0 0 1 1 1 0 0 0 1 1 0 1 0 0 1 0 0 1
I1 1 1 1 0 1 0 0 0 0 1 1 1 0 0 0 1 0 0 1
Q1 1 1 1 0 0 1 1 1 1 0 1 0 1 1 1 0 0 0 0

The driving electric signals I and Q respectively drive the upper branch and the lower branch of the dual-parallel modulator, and the dual-parallel modulator outputs the DQPSK signal. An expression of the $(k-1)^{th}$ DQPSK element $E_{k-1} = je^{jI_{k-1}} + e^{jQ_{k-1}}$ is obtained. The modulation principle is analyzed as follows.

When u=1 and v=1, it is obtained according to Table 1 that $I_k = \overline{I}_{k-1}$ and $Q_k = \overline{Q}_{k-1}$, so that the $k^{th}$ DQPSK element is $E_k = je^{jI_k} + e^{jQ_k} = je^{j\overline{I}_{k-1}} + e^{j\overline{Q}_{k-1}} = -je^{jI_{k-1}} - e^{jQ_{k-1}} = (je^{jI_{k-1}} + e^{jQ_{k-1}})e^{jp} = E_{k-1}e^{jp}$, that is, a phase shift p of adjacent DQPSK elements is corresponding to u=1 and v=1.

When u=1 and v=0, it is obtained according to Table 1 that $I_k = Q_{k-1}$ and $Q_k = \overline{I}_{k-1}$, so that the $k^{th}$ DQPSK element is $$E_k = e^{jI_k} + je^{jQ_k}$$
$$= je^{jQ_{k-1}} + e^{j\overline{I}_{k-1}}$$
$$= j(je^{jI_{k-1}} + e^{jQ_{k-1}})$$
$$= E_{k-1}e^{j\frac{p}{2}},$$

that is, a phase shift $$+\frac{p}{2}$$

of adjacent DQPSK elements is corresponding to u=1 and v=0.

When u=0 and v=1, it is obtained according to Table 1 that $I_k = \overline{Q}_{k-1}$ and $Q_k = I_{k-1}$, so that the $k^{th}$ DQPSK element is $$E_k = e^{jI_k} + je^{jQ_k}$$
$$= je^{jQ_{k-1}} + e^{jI_{k-1}}$$
$$= -j(je^{jI_{k-1}} + e^{jQ_{k-1}})$$
$$= E_{k-1}e^{-j\frac{p}{2}},$$

that is, a phase shift $$-\frac{p}{2}$$

of adjacent DQPSK elements is corresponding to u=0 and v=1.

When u=0 and v=0, it is obtained according to Table 1 that $I_k = I_{k-1}$ and $Q_k = Q_{k-1}$, so that the $k^{th}$ DQPSK element is $E_k = je^{jI_k} + e^{jQ_k} = je^{jI_{k-1}} + e^{jQ_{k-1}} = E_{k-1}$, that is, a phase shift 0 of adjacent DQPSK elements is corresponding to u=0 and v=0.

After the DQPSK element is transmitted to the DQPSK signal receiving device through optical fibers, the following steps are performed.

In Step 101, the splitter splits the DQPSK signal into two optical signals.

Figure 4A:
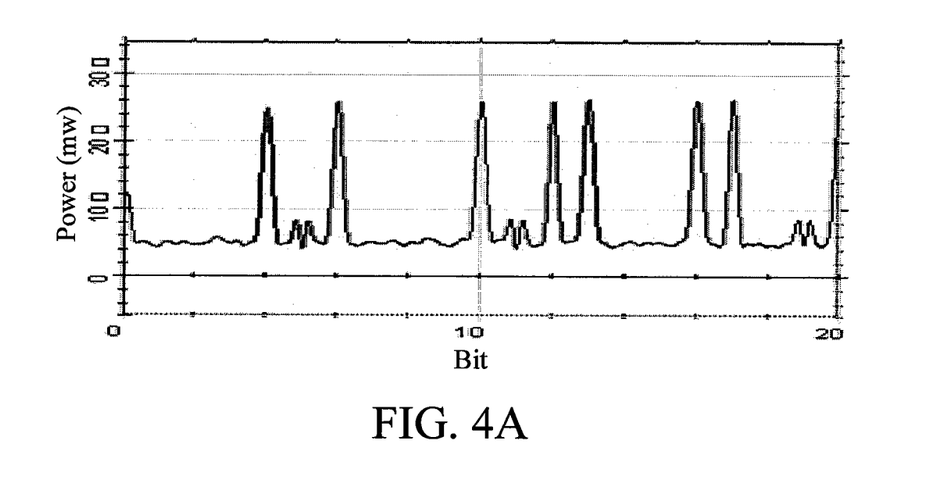
FIG. 4A is a schematic view of an output waveform of BPF1 obtained by emulation in the first embodiment of the method for receiving a DQPSK signal according to the present disclosure.
Figure 4B:
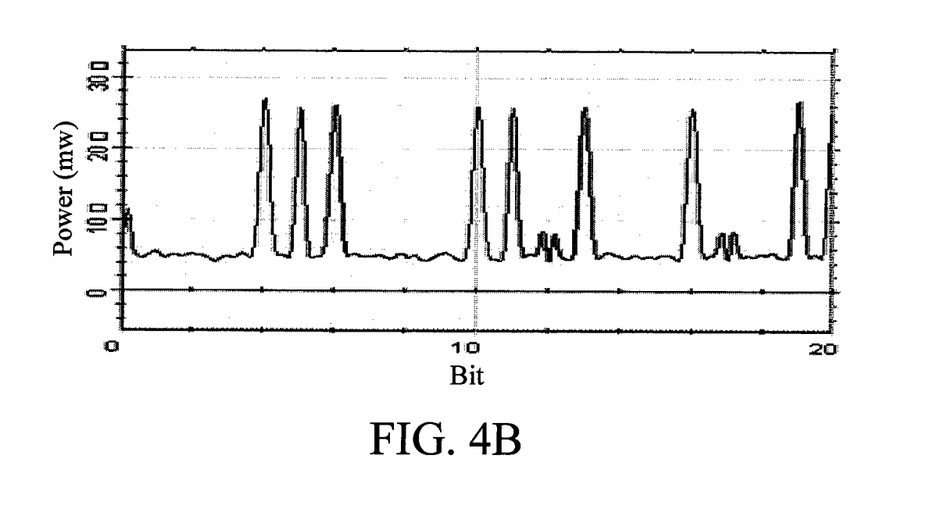
FIG. 4B is a schematic view of an output waveform of BPF2 obtained by emulation in the first embodiment of the method for receiving a DQPSK signal according to the present disclosure.

In Step 102, the BPF1 and the BPF2 optically bandpass filter each optical signal respectively, that is, performing demodulation on each optical signal. Central wavelengths of the two optical bandpass filters, the BPF1 and the BPF2, respectively have a negative wavelength offset and a positive wavelength offset from a central wavelength of the DQPSK signal. The wavelength shifts should be selected in such a way that the optical signals demodulated through the optical bandpass filters have an optimal performance, and the absolute values of the frequency offsets of the BPF1 and the BPF2 are most preferably about 1 time of the transmission rate of the DQPSK signal. For example, as for a DQPSK signal of 40 Gb/s, when the wavelength shift of the BPF1 is −0.3 nm, and the wavelength shift of the BPF2 is +0.3 nm, the upper and lower demodulated optical signals A and B have the optimal performance. That is, an optimal performance may be achieved when the offset is preferably approximately equal to the transmission rate (bandwidth). FIGS. 4A and 4B respectively show an output waveform of the BPF1 and an output waveform of the BPF2 obtained by emulation. It can be seen that, waveforms of A and B are one-to-one corresponding to u and v provided above in this embodiment. The DQPSK signal at a higher rate can be demodulated by simply increasing the bandwidth and offset of the optical bandpass filters. In addition, the increased bandwidth enables the optical bandpass filters to be easily manufactured.

The principle of demodulating the DQPSK signal through optical bandpass filtering is described as follows. The frequency domain of each bandpass filter is a Gaussian function, which is expressed as $$H_{filter}(w) = e^{-\frac{1}{4p^2}\left(\frac{w-w_c}{B_{2dB}}\right)^2},$$

in which $w_c$ is the central frequency corresponding to the central wavelength, and $B_{3dB}$ is a 3 dB bandwidth filter. The bandpass filter BPF1 is corresponding to a positive wavelength shift, and when the frequency offset is Dw, the Gaussian function is $$H_{filter}(w) = e^{-\frac{1}{4p^2}\left(\frac{w-w_c-Dw}{B_{3dB}}\right)^2}.$$

The bandpass filter BPF1 has a certain frequency offset, such that an edge of a filter amplitude spectrum passes through the major lobe of the DQPSK signal. If the edge of the filter amplitude spectrum is approximated as a sloped straight line Kw (K is a positive constant), the major lobe of the DQPSK frequency spectrum is $H_{DQPSK}(w)Kw$ after passing through the edge of the filter. The frequency domain expression turns to be $$KE_{DQPSK}(t)\frac{df(t)}{dt}$$

after an inverse Fourier transform. Likewise, if an edge of the filter amplitude spectrum of the bandpass filter BPF2 having a frequency offset of –Dw is approximated as a straight line –Kw, the major lobe of the DQPSK frequency spectrum is $-H_{DQPSK}(w)Kw$ after passing through the edge of the filter, which turns to be $$-KE_{DQPSK}(t)\frac{df(t)}{dt}$$

after an inverse Fourier transform, and $$\frac{df(t)}{dt}$$

represents performing derivation for the DQPSK phase f(t). Therefore, the demodulation principle of using the bandpass filters is to convert phase shift information of the DQPSK into amplitude information, thereby achieving the demodulation and recovering the original bit information.

For the BPF1, when $$\frac{df(t)}{dt} \neq 0,$$

the BPF1 has a pulse output; and when $$\frac{df(t)}{dt} = 0,$$

the BPF1 has no pulse output. Therefore, when the phase difference of adjacent DQPSK elements is $Df_{DQPSK}=0$, the BPF1 has no pulse output. When $$Df_{DQPSK} = \frac{p}{2} \text{ or } p,$$

$$\frac{df(t)}{dt}$$

is equivalent to performing derivation for a sinusoidal signal:

$$Df_{DQPSK} = \frac{p}{2},$$

the sinusoidal signal is at a rising edge from 0 to 1, $$\frac{df(t)}{dt}$$

is a positive value, and the BPF1 has a pulse output. When $\Delta\phi_{DQPSK}=\pi$, the sinusoidal signal includes a rising edge from 0 to 1 and a falling edge from 1 to 0. At the rising edge, $$\frac{df(t)}{dt}$$

is a positive value, and the BPF1 has a pulse output; and at the falling edge, $$\frac{df(t)}{dt}$$

is a negative value, and the BPF1 has no pulse output. When $$Df_{DQPSK} = -\frac{p}{2}, \frac{df(t)}{dt}$$

is a negative value, the output optical power of the BPF1 is lower than the power when $Df_{DQPSK}=0$, so that the BPF1 has no pulse output.

For the BPF2, when $$\frac{df(t)}{dt} \neq 0,$$

the BPF2 has a pulse output; and when $$-\frac{df(t)}{dt} = 0,$$

the BPF2 has no pulse output. Therefore, when $Df_{DQPSK}=0$, the BPF2 has no pulse output. When $$\Delta\varphi_{DQPSK} = -\frac{\pi}{2}$$

or, $$\pi\frac{df(t)}{dt}$$

is equivalent to performing derivation for a sinusoidal signal: when $$\Delta\varphi_{DQPSK} = -\frac{\pi}{2},$$

$$-\frac{df(t)}{dt}$$

is a positive value, and the BPF2 has a pulse output; and when $\Delta\phi_{DQPSK}=\pi$, the sinusoidal signal includes a rising edge from 0 to 1 and a falling edge from 1 to 0. At the rising edge, $$-\frac{df(t)}{dt}$$

is a negative value, and the BPF2 has no pulse output; and at the falling edge, $$-\frac{df(t)}{dt}$$

is a positive value, and the BPF2 has a pulse output. When $$Df_{DQPSK} = \frac{p}{2}, -\frac{df(t)}{dt}$$

is a negative value, the output optical power of the BPF2 is lower than the power when $Df_{DQPSK}=0$, so that the BPF2 has no pulse output.

To sum up, a demodulation mapping table of the DQPSK signal is obtained, as shown in Table 2.

TABLE 2

| $Df_{DQPSK} = f_{n+1} - f_n$ | 0 | $\frac{p}{2}$ | p | $-\frac{p}{2}$ |
|---|---|---|---|---|
| BPF1 outputs A | 0 | 1 | 1 | 0 |
| BPF2 outputs B | 0 | 0 | 1 | 1 |

It can be seen that, the optical signals A and B obtained through demodulation by the BPF1 and the BPF2 are corresponding to the bit information of the original data signals.

In Step 103, the optical signals A and B are respectively photoelectrically converted by the photoelectric detectors to obtain data signals u and v.

Figure 5:
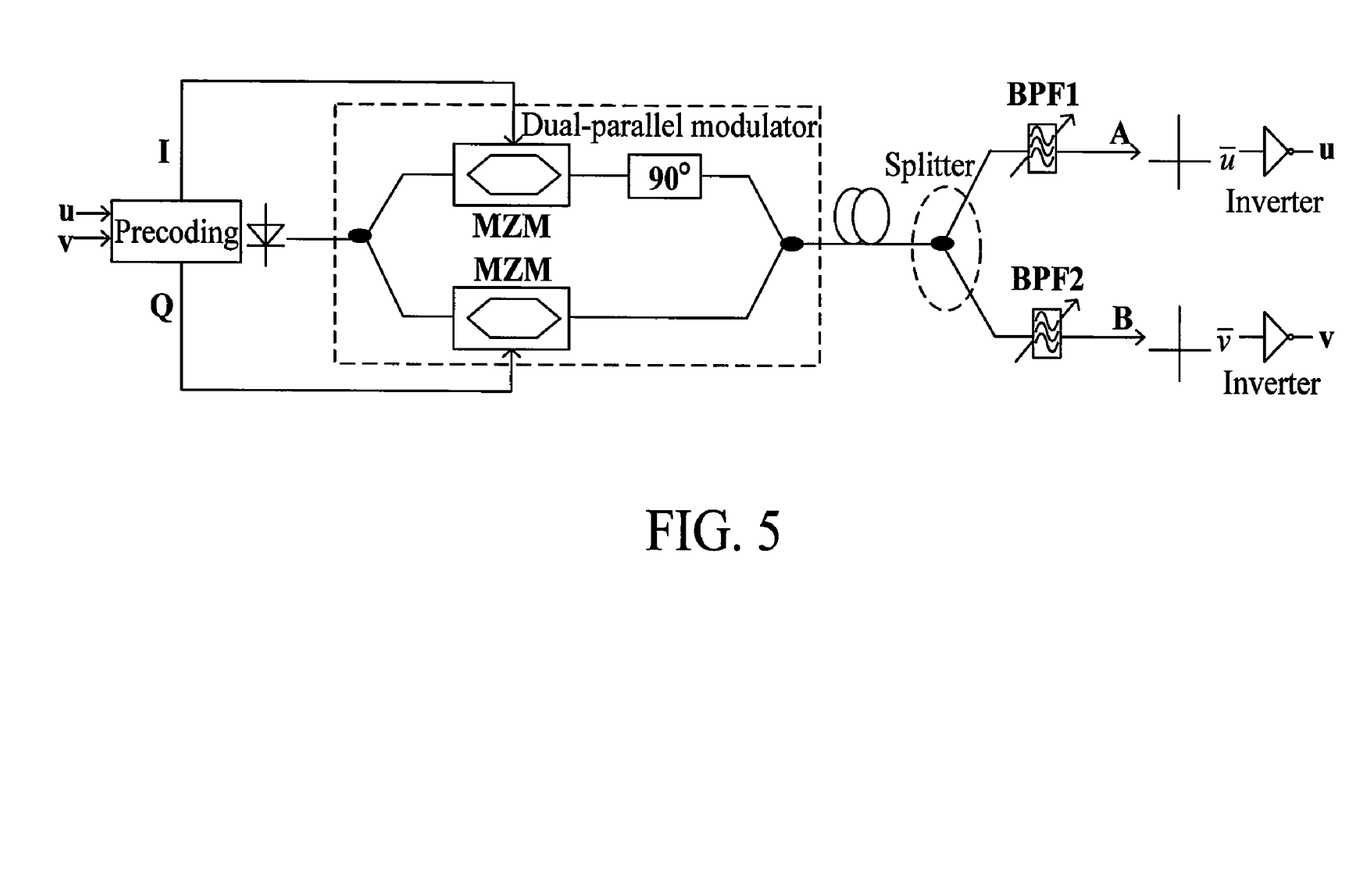
FIG. 5 is a schematic structural view of a second embodiment of the device for receiving a DQPSK signal according to the present disclosure.

FIG. 5 is a schematic structural view of a second embodiment of the device for receiving a DQPSK signal according to the present disclosure. When a pre-coding module at a DQPSK signal transmitting end uses the existing coding rules or coding equations, an inverter may be further added after photoelectric detectors at a DQPSK signal receiving device. After upper and lower demodulated optical signals pass through the upper and lower photoelectric detectors, inverse signals $\overline{u}$ and $\overline{v}$ are respectively generated. Then, the inverter recovers data signals u and v from the inverse signals $\overline{u}$ and $\overline{v}$.

Figure 6:
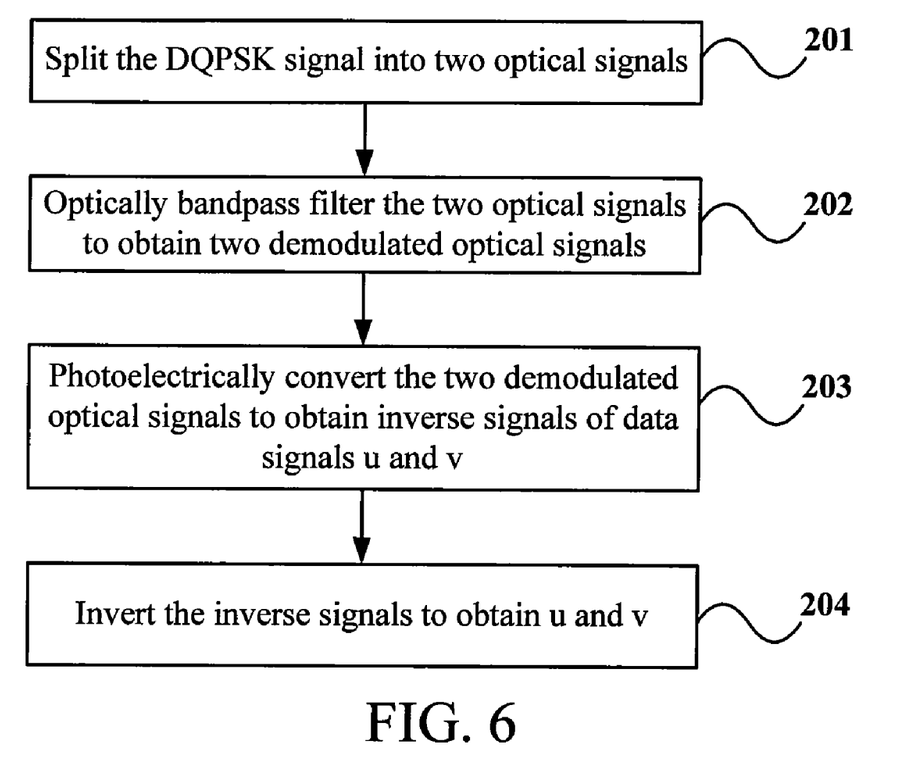
FIG. 6 is a flow chart of a second embodiment of the method for receiving a DQPSK signal according to the present disclosure.

FIG. 6 is a flow chart of a second embodiment of the method for receiving a DQPSK signal according to the present disclosure. It is assumed that a pre-coding module at a DQPSK signal transmitting end uses the existing coding rules or coding equations such as $I_k=u_k Å(\overline{I_{k-1}Q_{k-1}})+v_k Å(\overline{I_{k-1}\overline{Q}_{k-1}})$ or $Q_k=u_k Å(\overline{I_{k-1}\overline{Q}_{k-1}})+v_k Å(I_{k-1}\overline{Q}_{k-1})$, in which $I_k$ and $Q_k$ are respectively the $k^{th}$ symbols in the upper and lower branches generated by pre-coding, $I_{k-1}$ and $Q_{k-1}$ are respectively symbols previous to $I_k$ and $Q_k$, $u_k$ and $v_k$ are respectively the $k^{th}$ symbols of the input data u and v, $\overline{I}_{k-1}$ and $\overline{Q}_{k-1}$ respectively represent negation of the symbols $I_{k-1}$ and $Q_{k-1}$, Å represents Exclusive-OR, and + represents OR.

That is, $$I_k = uvI_{k-1} + u\overline{v}\overline{Q}_{k-1} + \overline{u}vI_{k-1} + \overline{u}vQ_{k-1}$$

$$Q_k = uvQ_{k-1} + u\overline{v}I_{k-1} + \overline{u}vI_{k-1} + \overline{uv}Q_{k-1}$$

$$I_k = uI_{k-1}\overline{Q}_{k-1} + \overline{v}\overline{I}_{k-1}\overline{Q}_{k-1} + \overline{u}\overline{I}_{k-1}Q_{k-1} + vI_{k-1}Q_{k-1}$$

or $$Q_k = v\overline{I}_{k-1}Q_{k-1} + \overline{u}\overline{I}_{k-1}\overline{Q}_{k-1} + uI_{k-1}Q_{k-1} + \overline{v}I_{k-1}\overline{Q}_{k-1}$$

The corresponding coding rules are shown in Table 3.

TABLE 3

| $u_k$ | 0 | 0 | 1 | 1 |
|---|---|---|---|---|
| $v_k$ | 0 | 1 | 0 | 1 |
| $I_k$ | $\overline{I}_{k-1}$ | $Q_{k-1}$ | $\overline{Q}_{k-1}$ | $I_{k-1}$ |
| $Q_k$ | $\overline{Q}_{k-1}$ | $\overline{I}_{k-1}$ | $I_{k-1}$ | $Q_{k-1}$ |

Similarly, as derived from the existing coding equations or Table 3, the DQPSK elements corresponding to the data signals u and v and the phase shift values of the adjacent DQPSK elements are shown as follows.

When u=1 and v=1, $E_k = je^{jI_k} + e^{jQ_k} = je^{jI_{k-1}} + e^{jQ_{k-1}} = E_{k-1}$, that is, the phase shift p of adjacent DQPSK elements is corresponding to u=1 and v=1.

When u=1 and v=0, $$E_k = e^{jI_k} + je^{jQ_k}$$

$$= je^{j\overline{Q}_{k-1}} + e^{jI_{k-1}}$$

$$= -j(je^{jI_{k-1}} + e^{jQ_{k-1}})$$

$$= E_{k-1}e^{-j\frac{p}{2}},$$

that is, the phase shift $$+\frac{p}{2}$$

of adjacent DQPSK elements is corresponding to u=1 and v=0.

When u=0 and v=1, $$E_k = e^{jI_k} + je^{jQ_k}$$

$$= je^{jQ_{k-1}} + e^{j\overline{I}_{k-1}}$$

$$= j(je^{jI_{k-1}} + e^{jQ_{k-1}})$$

$$= E_{k-1}e^{j\frac{p}{2}},$$

that is, the phase shift $$-\frac{p}{2}$$

of adjacent DQPSK elements is corresponding to u=0 and v=1.

When u=0 and v=0, $E_k = je^{jI_k} + e^{jQ_k} = je^{j\overline{I}_{k-1}} + e^{j\overline{Q}_{k-1}} = -je^{jI_{k-1}}e^{jQ_{k-1}} = (je^{jI_{k-1}} + e^{jQ_{k-1}})e^{jp} = E_{k-1}e^{jp}$, that is, the phase shift 0 of adjacent DQPSK elements is corresponding to u=0 and v=0.

After the receiving device receives the DQPSK signal, the following steps are performed.

In Step 201, the splitter splits the DQPSK signal into two optical signals.

In Step 202, the BPF1 and the BPF2 respectively demodulate the optical signals, and the table of the corresponding relation between the obtained optical signals A and B and the phase shift value of adjacent DQPSK elements remains unchanged, which is still Table 2. However, at this time, the corresponding relation between the data signals u and v and the phase shift value of adjacent DQPSK elements has changed, as shown in Table 4.

TABLE 4

| | | | | |
|---|---|---|---|---|
| u | 1 | 0 | 0 | 1 |
| v | 1 | 1 | 0 | 0 |
| $Df_{DQPSK} = f_{n+1} - f_n$ | 0 | $\frac{p}{2}$ | p | $-\frac{p}{2}$ |
| BPF1 outputs A | 0 | 1 | 1 | 0 |
| BPF2 outputs B | 0 | 0 | 1 | 1 |

As seen from Table 4, the optical signal A obtained by demodulation is an inverse of the bit information of the data signal u, and the optical signal B obtained by demodulation is an inverse of the bit information of the data signal v.

In Step 203, after A and B pass through the photoelectric detectors, signals inversed to the signals u and v, that is, $\overline{u}$ and $\overline{v}$, are obtained. The original data signals u and v can be obtained through a further inversion.

In Step 204, $\overline{u}$ and $\overline{u}$ respectively pass through an inverter, such that the original input data signals are obtained.

In this embodiment, since the DQPSK signal is demodulated by using the optical bandpass filters, the device is quite simple, and has high stability, and polarization independent features. Moreover, the higher the signal transmission rate is, the more easily the device is manufactured. Thus, the performance of the optical transmission system is greatly improved, and the demodulation cost is greatly reduced.

Finally, it should be noted that, the above embodiments are merely provided for describing several implementations of the present disclosure, but not intended to limit the present disclosure. It should be understood by persons of ordinary skill in the art that, although the present disclosure has been described in detail with reference to the foregoing embodiments, modifications can be made to the technical solutions described in the foregoing embodiments, or equivalent replacements can be made to a certain part of the technical features in the technical solutions, as long as such modifications or replacements do not cause the essence of corresponding technical solutions to depart from the spirits and scope of the present disclosure.

What is claimed is:

1. A method for receiving a differential quadrature phase shift keying (DQPSK) signal, comprising:
   splitting, by a splitter, the DQPSK signal to obtain two optical signals;
   optically bandpass filtering the two optical signals respectively by using two optical bandpass filters that respectively have a positive frequency offset and a negative frequency offset from a central frequency of the DQPSK signal; and
   photoelectrically converting the filtered optical signals respectively to obtain data signals;
   wherein the DQPSK signal is obtained by:
   pre-coding input data according to pre-coding transforming equations of $I_k = \overline{uv}I_{k-1} + \overline{u}v\overline{Q}_{k-1} + uv\overline{I}_{k-1} + u\overline{v}Q_{k-1}\ I_k = \overline{u}I_{k-1}\overline{Q}_{k-1} + v\overline{I}_{k-1}\overline{Q}_{k-1} + u\overline{I}_{k-1}Q_{k-1} + \overline{v}I_{k-1}Q_{k-1}$ $Q_k = \overline{uv}Q_{k-1} + u\overline{vI}_{k-1} + \overline{u}vI_{k-1} + uv\overline{Q}_{k-1}$ or $Q_k = \overline{v}I_{k-1}Q_{k-1} + u\overline{I}_{k-1}\overline{Q}_{k-1} + \overline{u}I_{k-1}Q_{k-1} + vI_{k-1}\overline{Q}_{k-1}$ to obtain two driving signals;
   modulating an input optical carrier respectively by using the two driving signals, so as to obtain a real-part signal and an imaginary-part signal; and
   combining the real-part signal with the imaginary-part signal to generate the DQPSK signal.

2. A method for receiving a differential quadrature phase shift keying (DQPSK) signal, comprising:
   splitting, by a splitter, the DQPSK signal to obtain two optical signals;
   optically bandpass filtering the two optical signals respectively by using two optical bandpass filters that respectively have a positive frequency offset and a negative frequency offset from a central frequency of the DQPSK signal; and
   photoelectrically converting the filtered optical signals respectively to obtain data signals;
   wherein the DOPSK signal is obtained by:
   pre-coding input data according to pre-coding transforming equations of $I_k = \overline{uv}I_{k-1} + \overline{u}v\overline{Q}_{k-1} + uv\overline{I}_{k-1} + u\overline{v}Q_{k-1}\ I_k = \overline{u}I_{k-1}\overline{Q}_{k-1} + v\overline{I}_{k-1}\overline{Q}_{k-1} + u\overline{I}_{k-1}Q_{k-1} + \overline{v}I_{k-1}Q_{k-1}$ $Q_k = \overline{uv}Q_{k-1} + u\overline{vI}_{k-1} + \overline{u}vI_{k-1} + uv\overline{Q}_{k-1}$ or $Q_k = \overline{v}I_{k-1}Q_{k-1} + u\overline{I}_{k-1}\overline{Q}_{k-1} + \overline{u}I_{k-1}Q_{k-1} + vI_{k-1}\overline{Q}_{k-1}$ to obtain two driving signals;
   modulating an input optical carrier respectively by using the two driving signals, so as to obtain a real-part signal and an imaginary-part signal; and
   combining the real-part signal with the imaginary-part signal to generate the DOPSK signal;
   wherein after the obtaining the data signals, the method further comprises:
   inverting the data signals.

3. A method for obtaining a differential quadrature phase shift keying (DQPSK) signal, comprising:
   pre-coding input data according to pre-coding transforming equations $I_k = \overline{uv}I_{k-1} + \overline{u}v\overline{Q}_{k-1} + uv\overline{I}_{k-1} + u\overline{v}Q_{k-1}\ I_k = \overline{u}I_{k-1}\overline{Q}_{k-1} + v\overline{I}_{k-1}\overline{Q}_{k-1} + u\overline{I}_{k-1}Q_{k-1} + \overline{v}I_{k-1}Q_{k-1}$ of $Q_k = \overline{uv}Q_{k-1} + u\overline{vI}_{k-1} + \overline{u}vI_{k-1} + uv\overline{Q}_{k-1}$ or $Q_k = \overline{v}I_{k-1}Q_{k-1} + u\overline{I}_{k-1}\overline{Q}_{k-1} + \overline{u}I_{k-1}Q_{k-1} + vI_{k-1}\overline{Q}_{k-1}$ to obtain two driving signals;
   modulating an input optical carrier respectively by using the two driving signals, so as to obtain a real-part signal and an imaginary-part signal; and
   combining the real-part signal with the imaginary-part signal to generate the DQPSK signal.

* * * * *